May 12, 1964  C. O. SCHMIDT, JR  3,132,374
METHOD OF BLEEDING SLAUGHTER ANIMALS
Original Filed April 1, 1960  3 Sheets-Sheet 1

INVENTOR.
CARL OSCAR SCHMIDT, JR
BY
*J. Warren Kinney Jr.*
ATTORNEY

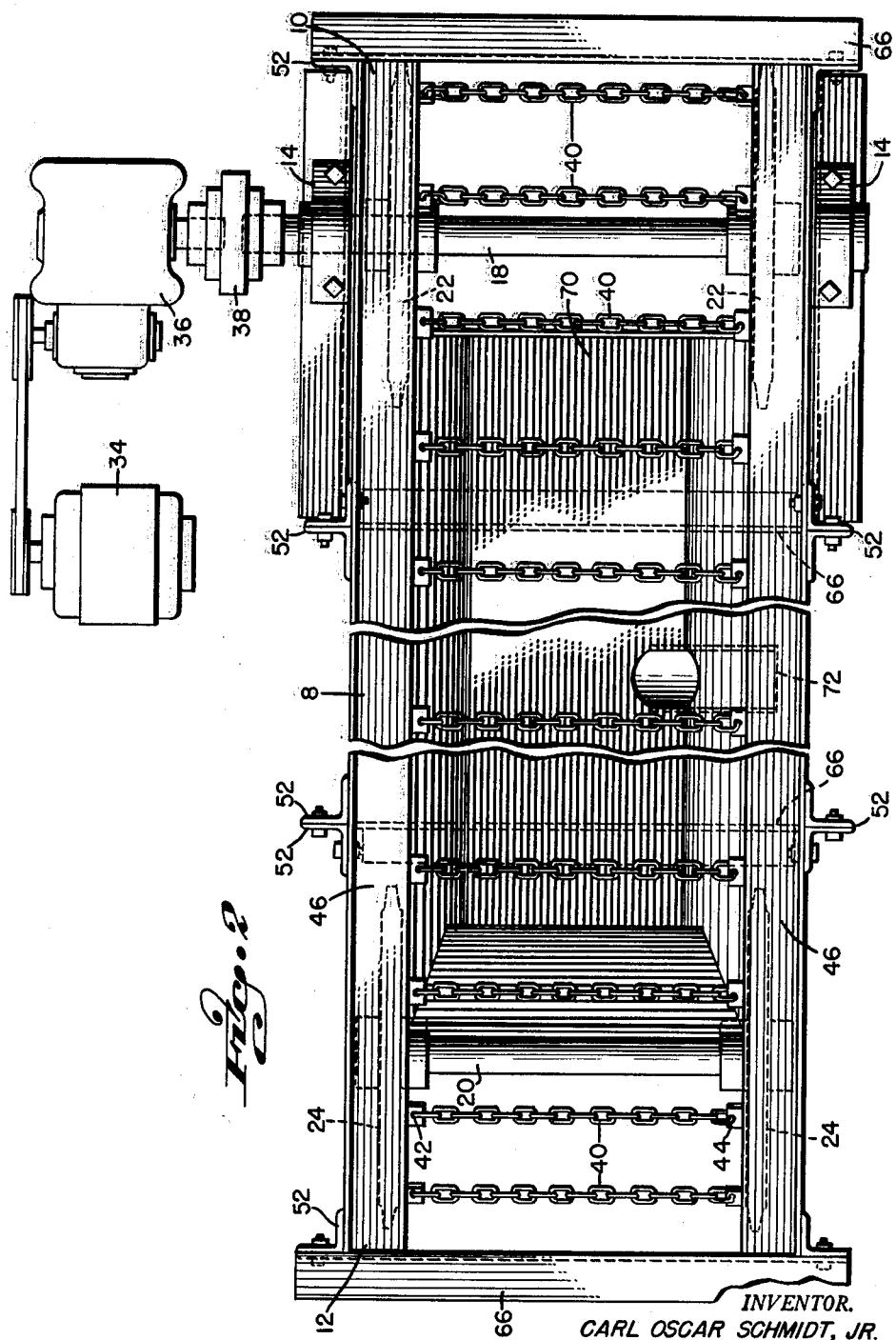

May 12, 1964    C. O. SCHMIDT, JR    3,132,374
METHOD OF BLEEDING SLAUGHTER ANIMALS
Original Filed April 1, 1960    3 Sheets-Sheet 3
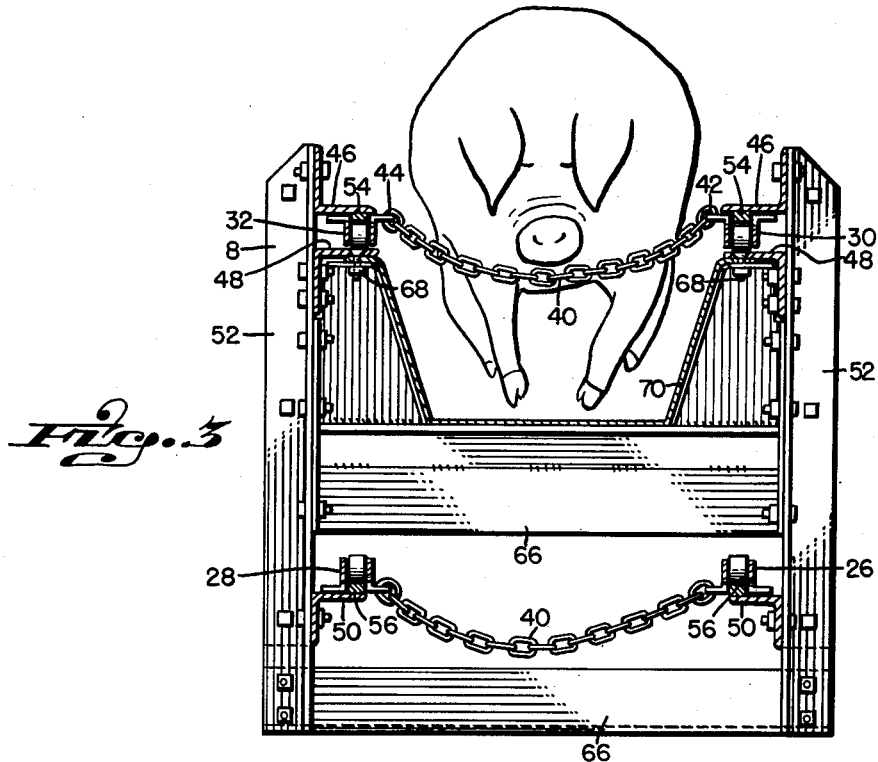
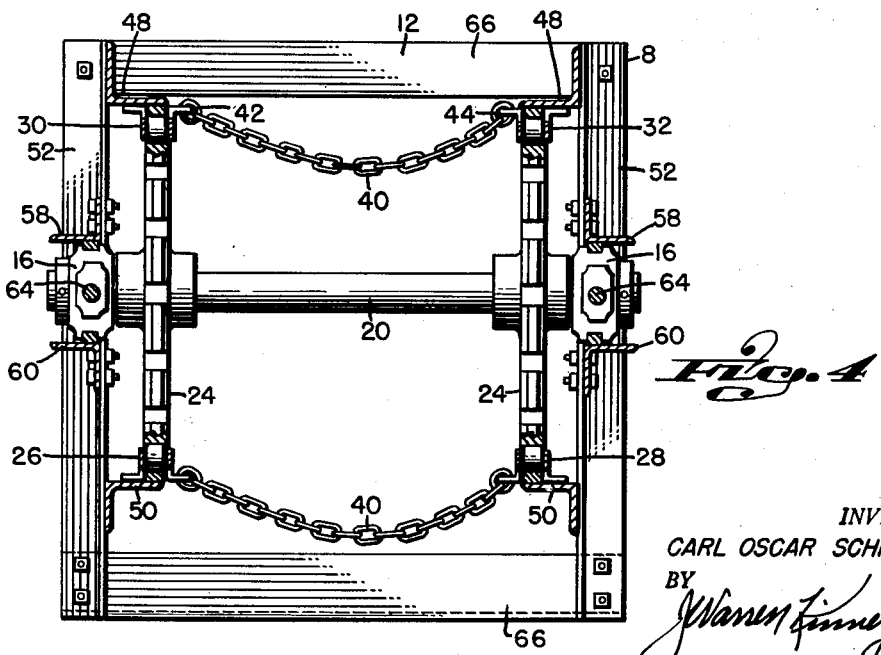
INVENTOR.
CARL OSCAR SCHMIDT, JR.
BY
ATTORNEY 3,132,374
METHOD OF BLEEDING SLAUGHTER ANIMALS
Carl Oscar Schmidt, Jr., Wyoming, Ohio, assignor to The Cincinnati Butchers' Supply Company, Cincinnati, Ohio, a corporation of Ohio
Original application Apr. 1, 1960, Ser. No. 19,258, now Patent No. 3,076,996, dated Feb. 12, 1963. Divided and this application July 6, 1962, Ser. No. 208,026
4 Claims. (Cl. 17—45)

The present invention relates to a method of bleeding slaughter animals after sticking, and is a division of my co-pending patent application, Serial No. 19,258, filed April 1, 1960, now Patent No. 3,076,996, issued February 12, 1963.

Bleeding conveyors are employed to transfer stuck animals from one processing station to another, in a production line system of meat processing. In the course of transfer, the bleeding conveyor is timed to permit a required period of bleeding in advance of scalding and dissection of the meat animal.

An object of the invention is to facilitate and expedite the slaughter of animals in a production line system of meat processing.

Another object is to minimize labor of handling meat animals in the course of processing.

A further object of the invention is to promote cleanliness and sanitation in the bleeding stage of meat processing.

Another object is to provide improved, highly serviceable apparatus for conveying animals during the bleeding process, resulting in substantial savings of labor, time and expense, as well as floor space in the packing plant.

The foregoing and other objects are attained by the means described herein and illustrated in the accompanying drawings, in which:

FIG. 2 is a top plan view of the same.

FIG. 3 is a cross-sectional view taken on line 3—3 of FIG. 1, and showing a stuck animal deposited thereon.

FIG. 4 is a cross-sectional view taken on line 4—4 of FIG. 1.

Figure 1:
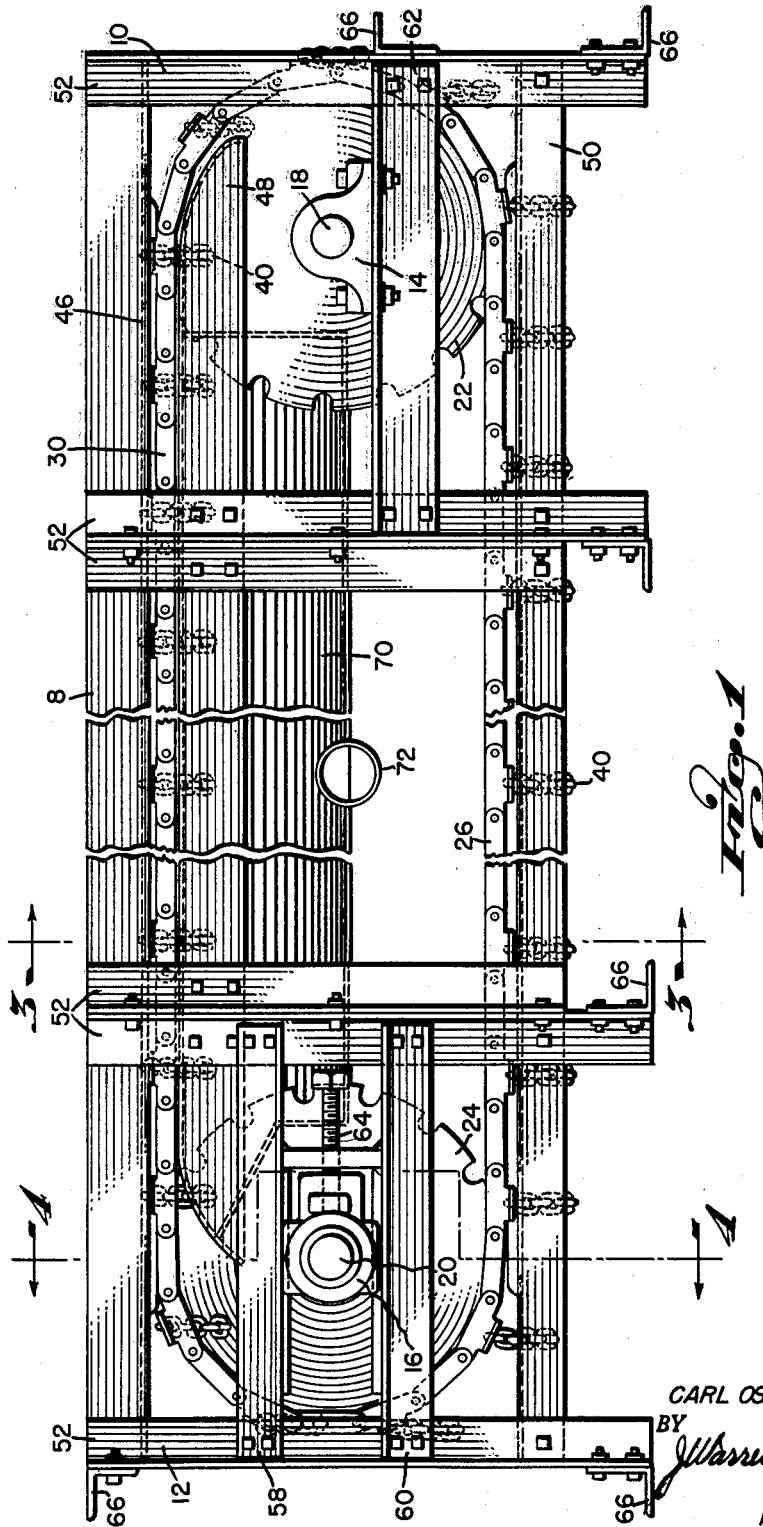
FIG. 1 is a side elevational view of the improved bleeding conveyor of the invention.

Referring to the drawings, 8 indicates an elongate frame having opposite end portions 10 and 12 carrying bearings 14 and 16 adapted to support the transverse shafts 18 and 20 of pairs of sprockets 22 and 24. Trained over the sprockets are the endless chains 26 and 28, the upper runs 30 and 32 of which extend lengthwise of the frame in spaced parallelism. The chains are driven in unison by the sprockets 22—22 which are fixed to shaft 18, the shaft being subject to continuous slow rotation in any suitable manner, as by means of a motor 34 driving a speed reducer 36 coupled to shaft 18 at 38.

Spanning the chains 26 and 28 at intervals is a succession of slings 40, opposite ends 42 and 44 of which are secured to the conveyor chains at opposite sides of the conveyor frame. The slings preferably are flexible of character, and should not be too tightly stretched across the conveyor chains, for it is desirable that the slings conform to some extent with the contour of the carcass placed thereon, as suggested by FIG. 3. Heavy chains have been found to serve quite satisfactorily as slings, although flexible straps or cables might be substituted therefor. The chain slings suspendingly support the carcass in the position at which it was initially placed thereon, and the links by reason of their constant movement during operation of the conveyor, are largely self-cleaning, as shown in FIG. 3. The distance between slings should be such that several slings support the same carcass placed thereon.

The frame of the conveyor may include three pairs of horizontal rails 46, 48, 50, preferably in the fom of angle irons, supported by a number of fame uprights 52 to which the rails are bolted or otherwise fixed. The rails 48 and 50 serve as tracks supporting, respectively, the upper and lower runs of the conveyor chains. Rails 46 may overlie the upper runs of the conveyors, and each such rail may carry a depending longitudinal rib 54 adapted to extend between the chain links for the purpose of maintaining a predetermined spacing between the two upper runs of the conveyor chains irrespective of any weight carried by the slings. The lower rails 50 may be equipped with similar ribs 56, to keep the lower runs in position upon the rails.

Frame members 58, 60 and 62 may be applied to the end portions of the frame sides to support the bearings 16 and 14. It may be noted that the bearings 16—16 are desirably supported between frame members 58 and 60 for adjustment lengthwise of the conveyor, adjustment screws 64 being provided for the purpose. The sides of the main frame may be maintained in spaced parallelism by means of a series of cross braces 66.

Suspended from the rails 48—48 at the bolts 68 is a longitudinal bleeding trough 70, which extends substantially the full distance between the sprocket shafts 18 and 20, for collecting blood from animals supported in movement by the slings. The trough may be provided with one or more drainage outlets 72.

In use, the bleeding conveyor is maintained in continuous operation, and at one end thereof a succession of animals is placed upon the slings following an insensitizing and sticking operation. The apparatus herein disclosed makes it possible to place the animals upon the slings without laborious turning of the animals crosswise of the direction of conveyor movement, as was common practice heretofore. Likewise, as the animals reach the discharge end of the conveyor, no turning of the carcasses is necessary in order to remove them from the conveyor and pass them on to a subsequent processing operation. The slings hold the carcasses in a horizontal and prone position at all times, which assures maximum bleeding in such manner as to prevent undesirable splattering of blood around and about the conveyor apparatus, so that clean and sanitary conditions may prevail at all times.

Use of the apparatus in practice has substantially reduced the labor involved in handling animals undergoing slaughtering, and has contributed very materially to the maintenance of an orderly and sanitary procedure within the packing plant. The work of slaughtering thereby has been rendered much cleaner and more attractive to workers in the industry, as working conditions have been desirably improved thereby.

It is to be understood that the method of the present invention may be practiced using apparatus other than that illustrated in the drawings and as described herein, the aforesaid apparatus being merely exemplary in nature, since the subject method may be practiced utilizing any means capable of supporting a slaughter animal, after sticking, in a prone position with its legs hanging or dangling during the bleeding operation.

What is claimed is:

1. In conjunction with a production line system of meat processing, the method of transferring an animal from one processing station to another while bleeding after the insensitized animal has been stuck, said method comprising pronely suspending the animal by engaging the underside of its body, with the animal's legs hanging and dangling freely, and moving the animal while so suspended, along a given path substantially parallel to the length of the animal, toward another station and maintaining the animal in such pronely suspended position while being so moved and until it is fully bled.

2. In conjunction with a production line system of meat processing, the method of transferring an animal from one processing station to another while bleeding after the insensitized animal has been stuck, said method comprising pronely suspending the animal by engaging the underside of its body at at least two locations thereon, with the animal's legs hanging and dangling freely, and moving the animal while so suspended, along a given path substantially parallel to the length of the animal, toward another station and maintaining the animal in such pronely suspended position while being so moved and until it is fully bled.

3. In conjunction with a production line system of meat processing, the method which consists in first sticking an insensitized animal, then suspending the stuck animal in a prone position by engaging the underside of the animal's body at at least two locations thereon, with its legs hanging and dangling freely, and moving the animal while so suspended, along a given path substantially parallel to the length of the animal, toward another station and maintaining the animal in such pronely suspended position while being so moved and until it is fully bled.

4. In conjunction with a production line system of meat processing, the method of transferring an animal from one processing station to another while bleeding after the insensitized animal has been stuck, said method comprising pronely suspending the animal by engaging the underside of its body, with the animal's legs hanging and dangling freely, and moving the animal horizontally while so suspended, along a given path substantially parallel to the length of the animal, toward another station and maintaining the animal in such pronely suspended position while being so moved and until it is fully bled.

References Cited in the file of this patent
UNITED STATES PATENTS

| | | |
|---|---|---|
| 712,579 | Nicholson et al. | Nov. 4, 1902 |
| 2,185,949 | Regensburger | Jan. 2, 1940 |